(12) United States Patent
Kanenari et al.

(10) Patent No.: US 8,839,830 B2
(45) Date of Patent: Sep. 23, 2014

(54) METHOD AND DEVICE FOR RECOVERING PUNCTURE REPAIR LIQUID

(75) Inventors: Daisuke Kanenari, Hiratsuka (JP); Takahiro Okamatsu, Hiratsuka (JP); Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 186 days.

(21) Appl. No.: 13/521,166

(22) PCT Filed: Nov. 19, 2010

(86) PCT No.: PCT/JP2010/070677
§ 371 (c)(1),
(2), (4) Date: Jul. 9, 2012

(87) PCT Pub. No.: WO2011/086764
PCT Pub. Date: Jul. 21, 2011

(65) Prior Publication Data
US 2013/0126037 A1    May 23, 2013

(30) Foreign Application Priority Data

Jan. 15, 2010   (JP) ................................ 2010-006707
Jan. 15, 2010   (JP) ................................ 2010-006710

(51) Int. Cl.
| | | |
|---|---|---|
| B65B 31/04 | (2006.01) | |
| B29C 73/16 | (2006.01) | |
| B29C 73/22 | (2006.01) | |
| B29C 73/02 | (2006.01) | |
| B29L 30/00 | (2006.01) | |

(52) U.S. Cl.
CPC .............. *B29C 73/02* (2013.01); *B29C 73/166* (2013.01); *B29C 73/22* (2013.01); *B29L 2030/00* (2013.01)

USPC ...................... 141/65; 141/8; 141/38; 141/66

(58) Field of Classification Search
CPC .............................. B29C 73/166; B60C 5/004
USPC .............................................. 141/8, 38, 65, 66
See application file for complete search history.

(56) References Cited

U.S. PATENT DOCUMENTS 5,927,348 A * 7/1999 Gerresheim et al. ............ 141/65

FOREIGN PATENT DOCUMENTS

| JP | 01-266047 A | 10/1989 |
|---|---|---|
| JP | 10-67212 A | 3/1998 |
| JP | 2003-127242 A | 5/2003 |
| JP | 2005-138400 A | 6/2005 |
| JP | 2007-331210 A | 12/2007 |
| JP | 2009-041006 A | 2/2009 |
| JP | 2009-090574 A | 4/2009 |

* cited by examiner

OTHER PUBLICATIONS

International Search Report of corresponding International Application No. PCT/JP2010/070677, dated on Feb. 1, 2011.

*Primary Examiner* — Jason K Niesz
(74) *Attorney, Agent, or Firm* — Global IP Counselors, LLP

(57) ABSTRACT

A method and device for recovering puncture repair liquid without cutting out a tire valve. The method uses a device including a tube and either a pipe member or a drainage device. The tube reaches a tire inner surface when inserted into the tire from a tire valve mounted to a wheel, and the pipe member or drainage device connects between the tire valve and a pressurized air source. A valve core is detached from a tire valve of the wheel. The tube is inserted into the tire via the valve, the pipe member or drainage device is connected between the valve and air source, the tire is filled with air from the air source, and the puncture repair liquid in the tire is recovered through an end portion of the pipe member or drainage port due to air escaping from the tire.

35 Claims, 16 Drawing Sheets

FIG. 2
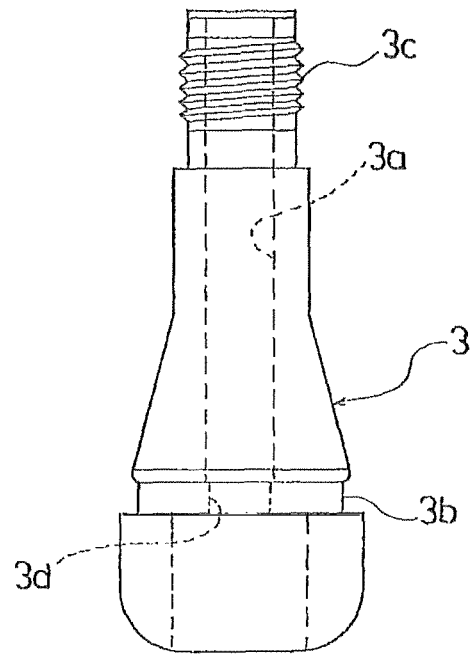
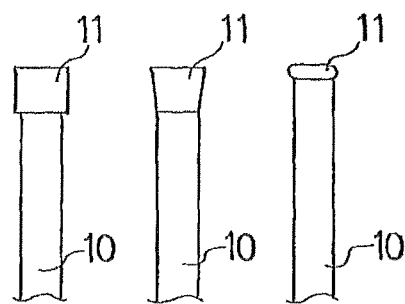
FIG. 3 (a)   FIG. 3 (b)   FIG. 3 (c)

METHOD AND DEVICE FOR RECOVERING PUNCTURE REPAIR LIQUID

CROSS-REFERENCE TO RELATED APPLICATIONS

This U.S. National stage application claims priority under 35 U.S.C. §119(a) to Japanese Patent Application No. 2010-006707, filed in Japan on Jan. 15, 2010, and Japanese Patent Application No. 2010-006710, filed in Japan on Jan. 15, 2010 the entire contents of Japanese Patent Application Nos. 2010-006707 and 2010-006710 are hereby incorporated herein by reference.

BACKGROUND

1. Field of the Invention

The present invention relates to a method and a device for recovering puncture repair liquid injected into a tire, and more specifically relates to a method and a device for recovering puncture repair liquid which make it possible to efficiently perform a recovery operation without cutting out a tire valve.

2. Background Information

In recent years, when a tire attached to a vehicle goes flat, puncture repair liquid is injected into the tire via a tire valve to thereby repair the puncture on an emergency basis and at the same time to fill the tire with air.

The method for repairing a puncture as described above, however, has the following problem. Specifically, the puncture repair liquid remains in the tire. Thus, when the tire is detached from a wheel to be replaced with a new one, the puncture repair liquid overflowed from the tire is smeared on equipment such as a tire changer.

Various methods for preventing the puncture repair liquid from overflowing are proposed as countermeasures for the problem. For example, a method has been proposed in Japanese patent application Kokai publication No. 2009-41006 in which an emulsion coagulant is injected into a tire to solidify a puncture repair liquid remaining therein, and the solidified puncture repair liquid is disposed of after the tire is detached from a wheel. However, this case exhibits a disadvantage that the emulsion coagulant is difficult to inject into the tire attached to the wheel.

Other methods have been proposed in Japanese patent application Kokai publication No. 2003-127242 and Japanese patent application Kokai publication No. Hei 10-67212 in which a tire valve is cut out from a wheel, a tube is inserted into the tire through a tire-valve attaching hole, and puncture repair liquid in the tire is drained through the tube. However, this case exhibits a disadvantage that the tire valve needs to be cut out and thus the tire valve cannot be reused.

Still another method has been proposed in Japanese patent application Kokai publication No. 2007-331210 in which a tube for forming a gas passage and a tube for forming a liquid passage are inserted into a tire valve, pressurized air is introduced into a tire through the gas passage while puncture repair liquid is drained from the tire through the liquid passage. However, this case exhibits a disadvantage that the draining requires a considerable time. This is because the need to insert the tube for forming the gas passage and the tube for forming the liquid passage into the tire valve inevitably leads to the need to make the liquid passage extremely narrow.

SUMMARY

An object of the present invention is to provide a method and a device for recovering puncture repair liquid which make it possible to efficiently perform a recovery operation without cutting out a tire valve.

A method for recovering puncture repair liquid according to a first invention for achieving the object is characterized in that the method includes: using a device for recovering puncture repair liquid comprising a tube and a pipe member, the tube having at least such a length that the tube reaches an inner surface of a tire when inserted into the tire from a tire valve attached to a wheel, the pipe member having one end portion configured to be connected to the tire valve and the other end portion configured to be connected to a pressurized air source; detaching a valve core from a tire valve of a wheel with a tire mounted thereon into which puncture repair liquid has been injected; inserting the tube into the tire via the tire valve; connecting the one end portion of the pipe member to the tire valve; connecting the pressurized air source to the other end portion of the pipe member; filling the tire with air from the pressurized air source; then detaching the pressurized air source from the other end portion of the pipe member; and recovering the puncture repair liquid in the tire through the other end portion of the pipe member by utilizing an action caused by the pressure escaping from the tire.

A device for recovering puncture repair liquid according to the first invention for achieving the object is characterized in that the device for recovering puncture repair liquid includes a tube and a pipe member, the tube having at least such a length that the tube reaches an inner surface of a tire when inserted into the tire from a tire valve mounted to a wheel, the pipe member having one end portion configured to be connected to the tire valve and the other end portion configured to be connected to a pressurized air source.

A method for recovering puncture repair liquid according to a second invention for achieving the object is characterized in that the method includes: using a device for recovering puncture repair liquid comprising a tube and a drainage device, the tube having at least such a length that the tube reaches an inner surface of a tire when inserted into the tire from a tire valve mounted to a wheel, the drainage device having a valve connection port configured to be connected to the tire valve, a pressurization port configured to be connected to a pressurized air source, and a drainage port for draining puncture repair liquid, and having a selector valve provided to a passage configured to selectively connect the valve connection port with the pressurization port or the drainage port; detaching a valve core from a tire valve of a wheel with a tire mounted thereon into which a puncture repair liquid has been injected; inserting the tube into the tire via the tire valve; connecting the valve connection port of the drainage device to the tire valve; connecting the pressurized air source to the pressurization port of the drainage device; filling the tire with air from the pressurized air source in a state where the valve connection port of the drainage device is made to communicate with the pressurization port by the selector valve; making the valve connection port of the drainage device to communicate with the drainage port by the selector valve; and thereby recovering the puncture repair liquid in the tire through the drainage port of the drainage device by utilizing an action caused by the pressure escaping from the tire.

A device for recovering puncture repair liquid according to the second invention for achieving the object is characterized in that the device for recovering puncture repair liquid includes a tube and a drainage device, the tube having at least such a length that the tube reaches an inner surface of a tire when inserted into the tire from a tire valve mounted to a wheel, the drainage device comprising a valve connection port configured to be connected to the tire valve, a pressurization port configured to be connected to a pressurized air source, and a drainage port for draining puncture repair liquid, and having a selector valve provided to a passage configured to selectively connect the valve connection port with the pressurization port or the drainage port.

According to the first invention, a device for recovering puncture repair liquid including a tube and a pipe member is used, the tube is inserted into the tire via the tire valve, the tire valve, the pipe member, and the pressurized air source are connected together, the tire is filled with air from the pressurized air source, and thereafter the puncture repair liquid in the tire is recovered through the other end portion of the pipe member by utilizing an action caused by the pressure escaping from the tire. In this case, the tire valve does not have to be cut out. After the puncture repair liquid is recovered, the tire valve can be used as it is. In addition, since the tube can be made as wide as possible within an allowable range of the tire valve, the puncture repair liquid can be recovered in a shorter time than in a case where a tube for a gas passage and a tube for a liquid passage are inserted into a tire valve as in a conventional case. Thus, according to the present invention, the recovery operation of the puncture repair liquid can be efficiently performed without cutting out the tire valve. Moreover, the first invention has also an advantage that the device for recovering puncture repair liquid can be constituted of a small number of components without being complicated.

The pipe member preferably has flexibility. In this case, after the tire is filled with air from the pressurized air source, the pressurized air source is detached from the other end portion of the pipe member in a state where the passage of the pipe member is closed by bending or making flat the pipe member. Thereafter, by opening the passage in the pipe member, the puncture repair liquid in the tire is recovered through the other end portion of the pipe member. This can prevent the puncture repair liquid from spattering when the pressurized air source is detached from the pipe member.

It is preferable that an attachment having an opening portion be attached to the other end portion of the pipe member and that the puncture repair liquid be recovered with the opening portion of the attachment facing downward. The attachment is configured to be attachable to and detachable from the pressurized air source, and the opening portion is opened in a direction crossing an axial direction of the pipe member. Alternatively, it is preferable that the pipe member have a bent contour or a curved contour and that the puncture repair liquid is recovered with the other end portion of the pipe member facing downward. Still alternatively, it is preferable that the pipe member has a bellows portion in a portion thereof in a longitudinal direction thereof and that the puncture repair liquid be recovered with the other end portion of the pipe member facing downward. This can prevent the puncture repair liquid from spattering and makes it possible to reliably recover the puncture repair liquid in a container or the like.

The pipe member may include an opening/closing valve in a portion thereof in the longitudinal direction. In this case, the tire is filled with air from the pressurized air source with the opening/closing valve opened, and then the pressurized air source is detached from the other end portion of the pipe member with the opening/closing valve closed. Thereafter, by opening the opening/closing valve, the puncture repair liquid in the tire is recovered through the other end portion of the pipe member. This can prevent the puncture repair liquid from spattering when the pressurized air source is detached from the pipe member.

Meanwhile, the tube and the pipe member may be configured to be connectable with each other. This case makes it possible to simultaneously perform the insertion of the tube into the tire and the attaching of the pipe member to the tire valve, and thus to enhance the workability. Moreover, since the air tightness between the tube and the pipe member is ensured, the puncture repair liquid can be drained smoothly.

In contrast, according to the second invention, the device for recovering puncture repair liquid including a tube and a drainage device is used, the tube is inserted into the tire via the tire valve, the tire valve, the drainage device, and the pressurized air source are connected together, the tire is filled with air from the pressurized air source, and thereafter the puncture repair liquid in the tire is recovered through the drainage port of the drainage device by utilizing an caused by the pressure escaping from the tire. In this case, the tire valve does not have to be cut out. After the puncture repair liquid is recovered, the tire valve can be used as it is. In addition, since the tube can be made as wide as possible within an allowable range of the tire valve, the puncture repair liquid can be recovered in a shorter time than in a case where a tube for a gas passage and a tube for a liquid passage are inserted into a tire valve as in a conventional case. Thus, according to the second invention, the recovery operation of the puncture repair liquid can be efficiently performed without cutting out the tire valve.

The drainage device may be configured as follows. Specifically, the passage braches into a T-shape, the selector valve has an L-shaped guide path, the pressurization port and the drainage port are arranged at opposed positions, the valve connection port is made to communicate with the pressurization port at a first switching position of the selector valve, and the valve connection port is made to communicate with the drainage port at a second switching position of the selector valve. Alternatively, the drainage device may be configured as follows. Specifically, the selector valve includes two guide paths and is slidable in a direction orthogonal to the center axis of the tire valve, the valve connection port is made to communicate with the pressurization port at a first switching position of the selector valve, and the valve connection port is made to communicate with the drainage port at a second switching position of the selector valve. In the case of employing the drainage device as described above, such a mistake as to make the pressurization port and the drainage port communicate with each other can be reliably prevented.

In addition, it is preferable that the drainage port be provided with a spattering prevention member configured to prevent the puncture repair liquid from spattering. Providing the spattering prevention member can prevent the puncture repair liquid from spattering, and thus the recovery operation of the puncture repair liquid can be performed more efficiently.

In each of the first invention and the second invention, it is preferable that the tube be made narrower than a narrowest portion of a through-hole of the tire valve and that a locking portion thicker than the narrowest portion of the through-hole of the tire valve be provided to an end portion of the tube on the tire valve side. In this case, the tube can be inserted into the tire from the tire valve easily. In addition, since the locking portion of the tire provided on the end portion of the tube on the tire valve side is locked by the narrowest portion of the through-hole in the tire valve, the tube can be prevented from coming off the tire valve into the tire.

It is preferable that the tube have a scale indicating a cutting length and that the tube be cut, according to a tire size, based on the scale. Specifically, the tube is set at such a dimension of a length as to reach an inner surface of any assumable tire from the tire valve of the tire. The tube is appropriately cut based on the scale, and thereby the tube can be adapted to any of various tire sizes. The scale is preferably indicated on the tube, but a scale printed on paper or the like may be bundled with the tube, depending on the case.

Further, it is preferable that the device for recovering puncture repair liquid include a coagulant for coagulating the puncture repair liquid and a flexible bag for receiving and containing the puncture repair liquid therein. In this case, the puncture repair liquid drawn from the inside of the tire is injected into the bag, the puncture repair liquid and the coagulant are mixed together in the bag, and the puncture repair liquid is recovered in a coagulated state. Thereby, the spent puncture repair liquid can be disposed of as burnable waste easily and quickly.

BRIEF DESCRIPTION OF THE DRAWINGS

FIG. 2 is a side view showing an example of a tire valve used in the embodiment;

FIGS. 3(a) through 3(c) are side views of tubes used in the embodiment shown in FIG. 1;

FIGS. 16(a) through 16(c) show side views of different operations states of a pipe member in the device for recovering puncture repair liquid as shown in FIG. 15;

DETAILED DESCRIPTION OF EMBODIMENTS

Figure 1:
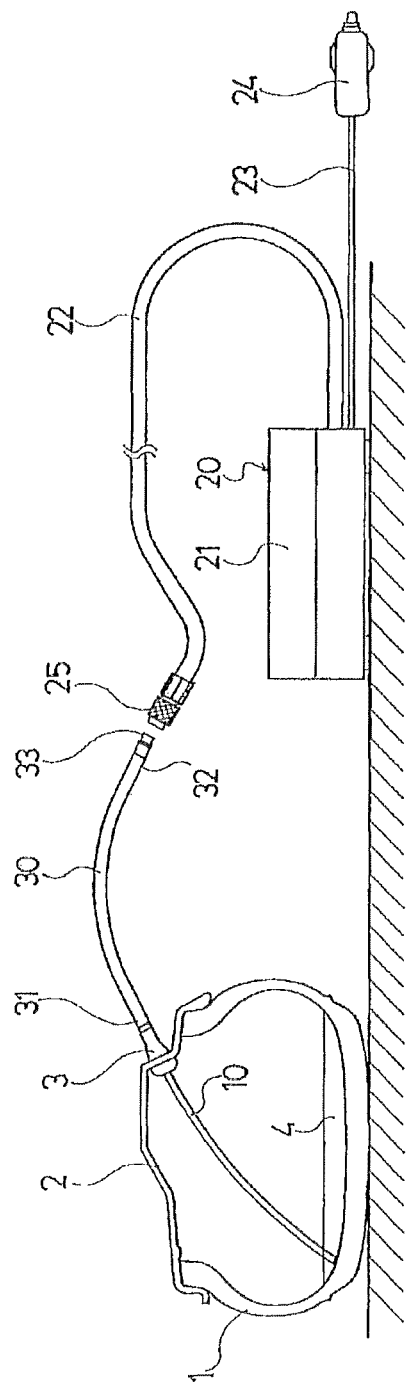
FIG. 1 is a side view showing a device for recovering puncture repair liquid according to an embodiment.
Figure 4:
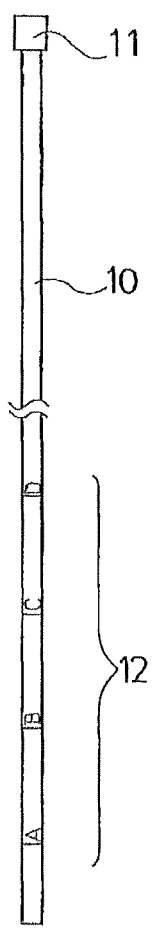
FIGS. 4(a) and 4(b) show side views of tubes used in the embodiment shown in FIG.1.
Figure 4:
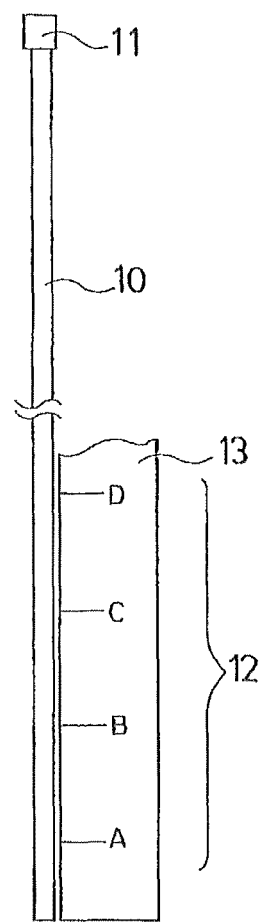
Figure 5:
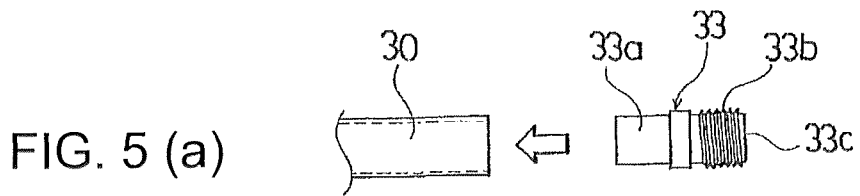
FIGS. 5(a) through 5(d) show side views of attachments of pipe members used in the embodiment shown in FIG. 1.
Figure 5:
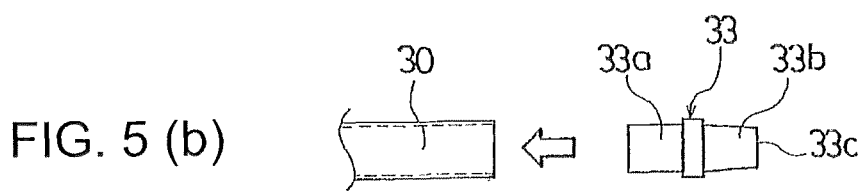
Figure 5:
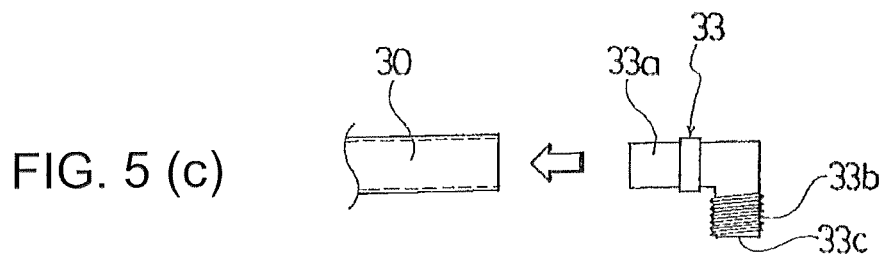
Figure 5:
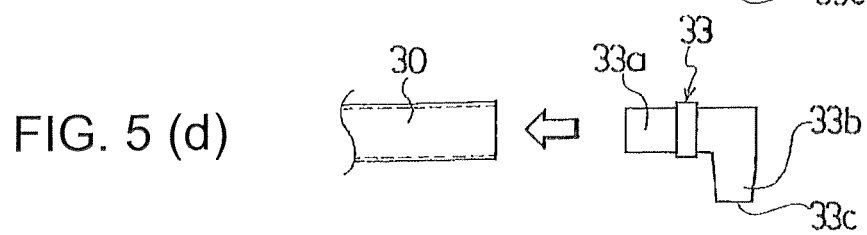

A configuration of the present invention will be described in detail below with reference to the attached drawings. FIGS. 1 to 11 show a device for recovering puncture repair liquid according to a first embodiment. FIG. 1 illustrates a pneumatic tire 1, a wheel 2, a tire valve 3 mounted to the wheel 2, and puncture repair liquid 4 injected into the pneumatic tire 1.

As shown in FIG. 1, the device for recovering puncture repair liquid in this embodiment includes a tube 10 and a pipe member 30. The tube 10 has at least such a length that the tube 10 reaches an inner surface of the tire when inserted into the tire 1 from the tire valve 3 of the wheel 2. The pipe member 30 is connected between the tire valve 3 and a pressurized air source 20.

As shown in FIG. 2, the tire valve 3 has a cylindrical through-hole 3a (illustrated in a broken line) therein. A narrowed portion 3b to be engaged with an attachment hole of the wheel 2 is formed on the proximal end side of the tire valve 3, while a male screw portion 3c is formed on the distal end side thereof. The through-hole 3a is narrowed locally in a portion in a longitudinal direction, and thus a narrowest portion 3d having the smallest diameter is formed in the portion. In air filling, a valve core (not illustrated) is inserted into the tire valve 3.

Meanwhile, the tube 10 includes a locking portion 11 in an end portion on the tire valve side as shown in FIGS. 3(a) through 3(c). An outer diameter of the tube 10 is smaller than an inner diameter of the narrowest portion 3d of the through-hole 3a of the tire valve 3, but an outer diameter of the locking portion 11 is larger than the inner diameter of the narrowest portion 3d of the through-hole 3a of the tire valve 3. In FIG. 3(a), a step is formed between the tube 10 and the locking portion 11. In FIG. 3(b), the locking portion 11 is tapered in such a manner as to be gradually widened from the main body side of the tube 10. In FIG. 3(c), the locking portion 11 is formed by thermally deforming an end of the tube 10 on the tire valve side. The locking portion 11 may also be formed into a similar shape of the valve core. It goes without saying that an adaptor for forming the locking portion 11 can be attached to the tube 10.

As described above, the tube 10 is made narrower than the narrowest portion 3d of the through-hole 3a of the tire valve 3, while the locking portion 11 thicker than the narrowest portion 3d of the through-hole 3a of the tire valve 3 is provided on the end portion of the tube 10 on the tire valve side. In this case, the tube 10 can be inserted into the tire 1 easily from the tire valve 3. In addition, since the locking portion 11 of the tube 10 is locked by the narrowest portion 3d of the through-hole 3a of the tire valve 3, the tube 10 can be prevented from coming off the tire valve 3 into the tire 1.

Also, air tightness between the tube 10 and the tire valve 3 can be ensured by making the locking portion 11 of the tube 10 thicker than the narrowest portion 3d. To ensure the air tightness, an inner circumferential surface of the through-hole 3a of the tire valve 3 and an outer circumferential surface of the locking portion 11 of the tube 10 may be brought into close contact with each other to thereby create a seal therebetween. Alternatively, an end face of the narrowest portion 3d of the through-hole 3a of the tire valve 3 in an axial direction of the tire valve 3 and an end face of the locking portion 11 of the tube 10 in an axial direction of the tube 10 may be brought into close contact with each other to thereby create a seal therebetween.

A material of the tube 10 is not particularly limited, and rubber such as silicone rubber, a synthesis resin such as polypropylene, polyethylene, polyurethane, polyamide or fluororesin, metal or the like can be used. However, a too soft material might deteriorate the performance of the insertion operation of the tube 10.

The outer diameter of the tube 10 may be set in a range from 2.5 mm to 3.15 mm. A too large diameter of the tube 10 makes it difficult to insert the tube 10 into the narrowest portion 3d of the through-hole 3a of the tire valve 3, while a too small diameter thereof requires a considerable time in draining of the puncture repair liquid 4. In contrast, the outer diameter of the locking portion 11 of the tube 10 may be set in a range from 3.2 mm to 4.0 mm. A too large diameter of the locking portion 11 makes it difficult to push the locking portion 11 into the tire valve 3, while a too small diameter causes the tube 10 to easily come off the tire valve 3 into the tire 1.

As shown in FIGS. 4(a) and 4(b), the tube 10 includes a scale 12 indicating a cutting length by using alphabets A to D. The tube 10 is designed to be cut, according to a tire size, based on the scale 12. Specifically, the tube 10 yet to be used is set at such a dimension of a length as to reach the inner surface of any assumable tire from the tire valve 3 of the tire. The tube 10 is designed to be adapted to any of various tire sizes by being appropriately cut based on the scale 12. In FIG. 4(a), the scale 12 is directly indicated on the tube 10. In FIG. 4(b), the scale 12 is printed on a sheet 13 made of paper or the like. The sheet 13 on which the scale 12 is printed may be dedicatedly provided, or part of an instruction manual may be utilized. In each of the cases, the instruction manual or the like describes what the scale 12 means. For example, the instruction manual describes a correspondence between the alphabets A to D on the scale 12 and the tire sizes. Lines of the scale 12 may be made distinguishable from each other by changing the thickness, color or number of the lines, or numerals, symbols or the like instead of the aforementioned alphabets may be provided to the scale 12.

As shown in FIG. 1, the pressurized air source 20 includes an electrical compressor 21, a hose 22 connected to the compressor 21, and a cord 23 and a plug 24 for connecting the compressor 21 to a power source. A connecting fitting 25 having a female screw portion is rotatably attached to an end of the hose 22.

Note that since the pressurized air source 20 is not required to supply a high pressure, a bicycle pump or the like can be used instead of the aforementioned electrical compressor 21. In this case, the power supply is not needed. A commercial large-scale compressor can be used instead of the portable compressor 21, as a matter of course.

The pipe member 30 includes a cylindrical pipe having a curved contour and is designed such that one end portion 31 is connected to the tire valve 3 and that the other end portion 32 is connected to the pressurized air source 20. The pipe member 30 has flexibility, and thus can be bent easily by hand and restore to the original contour. For this reason, a passage in the pipe member 30 can be closed as necessary by bending or making flat the pipe member 30.

A synthesis resin such as polyvinyl alcohol (PVA), polyethylene (PE) or the like or rubber such as silicone rubber may be used as a material forming the pipe member 30.

A structure of connecting the one end portion 31 of the pipe member 30 and the tire valve 3 and a structure of connecting the other end portion 32 of the pipe member 30 and the pressurized air source 20 are not particularly limited. The connections may be made by mechanical fastening or fitting utilizing elastic deformation. Herein, the one end portion 31 is fitted in the tire valve 3 based on the elastic deformation, and an attachment 33 attachable to and detachable from the pressurized air source 20 is attached to the other end portion 32. In other words, the attachment 33 has a male screw portion to be engaged with the connecting fitting 25 of the hose 22 of the pressurized air source 20.

Various structures as shown in FIGS. 5(a) through 5(d) can be employed for the attachment 33 of the pipe member 30. In FIG. 5(a), the attachment 33 includes: a fixed portion 33a to be fixed by being fitted into the pipe member 30; a connecting portion 33b having the male screw portion to be engaged in the connecting fitting 25 of the pressurized air source 20; and an opening portion 33c opened in an axial direction of the pipe member 30. FIG. 5(b), the attachment 33 includes: the fixed portion 33a to be fixed by being fitted into the pipe member 30; a connecting portion 33b gradually narrowed to be fitted into the connecting fitting 25 of the pressurized air source 20; and the opening portion 33c opened in the axial direction of the pipe member 30.

In FIG. 5(c), the attachment 33 includes: the fixed portion 33a to be fixed by being fitted into the pipe member 30; a connecting portion 33b having the male screw portion to be engaged in the connecting fitting 25 of the pressurized air source 20; and an opening portion 33c opened in a direction crossing the axial direction of the pipe member 30. In FIG. 5(d), the attachment 33 includes: the fixed portion 33a to be fixed by being fitted into the pipe member 30; a connecting portion 33b gradually narrowed to be fitted into the connecting fitting 25 of the pressurized air source 20; and an opening portion 33c opened in a direction crossing the axial direction of the pipe member 30. In the cases of FIGS. 5(c) and 5(d), the opening portion 33c of the attachment 33 is made to face downward at the time of recovering the puncture repair liquid 4, and this can prevent the puncture repair liquid 4 from spattering.

Figure 6:
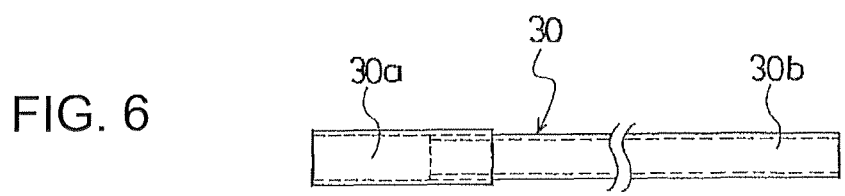
FIG. 6 is a side view showing a modification of the pipe member used in the embodiment shown in FIG. 1.

The pipe member 30 may be formed by combining together a large-diameter pipe 30a and a small-diameter pipe 30b inserted into the large-diameter pipe 30a, as shown in FIG. 6. In this case, the large-diameter pipe 30a is fitted around the tire valve 3, and the small-diameter pipe 30b is fitted into the connecting fitting 25 of the pressurized air source 20.

Figure 7:
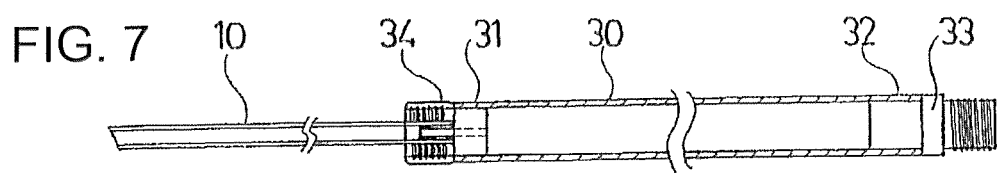
FIG. 7 is a cross-sectional view showing another modification of the pipe member used in the embodiment shown in FIG. 1.

In addition, the tube 10 and the pipe member 30 may be configured to be connectable with each other, as shown in FIG. 7. In FIG. 7, a connecting member 34 is attached to the end portion 31 of the pipe member 30, and the tube 10 and the pipe member 30 are connected with each other with the connecting member 34. This case makes it possible to simultaneously perform the insertion of the tube 10 into the tire 1 and the attaching of the pipe member 30 to the tire valve 3, and thus to enhance the workability. Moreover, since the air tightness between the tube 10 and the pipe member 30 is ensured, the puncture repair liquid 4 can be drained smoothly.

Figure 8:
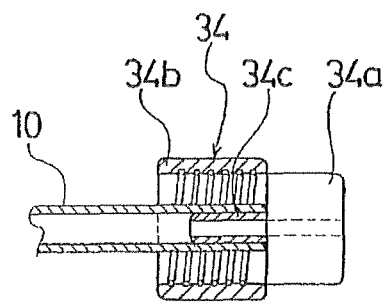
FIG. 8 is an enlarged cross-sectional view showing a structure in which the pipe member and a tube in FIG. 7 are connected with each other.
Figure 9:
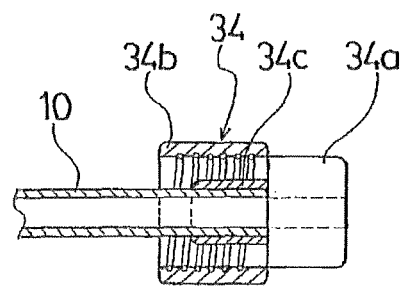
FIG. 9 is a cross-sectional view showing a modification of a structure in which the pipe member and the tube in FIG. 7 are connected with each other.

As shown in FIG. 8, the connecting member 34 includes: a fixed portion 34a to be fixed by being fitted into the pipe member 30; a connecting portion 34b having a female screw portion to be engaged with the tire valve 3; and a tubular protrusion 34c holding the end portion of the tube 10. In an example in FIG. 8, the tubular protrusion 34c is inserted into the tube 10. In contrast, in an example in FIG. 9, the tube 10 is inserted into the tubular protrusion 34c. In the former case, the need to make an outer diameter of the tubular protrusion 34c smaller than an inner diameter of the tube 10 leads to a smaller flow amount of the puncture repair liquid 4. In the latter case, the passage of the puncture repair liquid 4 can be sufficiently secured.

Next, a description is given of a method for recovering puncture repair liquid by using the aforementioned device for recovering puncture repair liquid. Firstly, as shown in FIG. 1, the valve core is detached from the tire valve 3 in the wheel 2 with the tire 1 mounted thereon into which the puncture repair liquid 4 has been injected, and the tube 10 is inserted into the tire 1 via the tire valve 3. Since the length of the tube 10 has been adjusted to an appropriate length in advance, one end of the tube 10 contacts the inner surface of the tire, while the locking portion 11 thereof on the tire valve side is locked with the narrowest portion 3d of the through-hole 3a of the tire valve 3.

Next, the one end portion 31 of the pipe member 30 is connected with the tire valve 3, while the hose 22 of the pressurized air source 20 is connected with the other end portion 32 of the pipe member 30. Thereby, the pipe member 30 is connected between the tire valve 3 and the pressurized air source 20 to form a series of pressurized air supply paths. Then, the tire 1 is filled with air from the pressurized air source 20. An amount of injecting the puncture repair liquid 4 is, for example, approximately 650 ml in the case of the size of 215/60R16, and thus the air pressure inside the tire 1 may be set to be a pressure for draining such an amount of the puncture repair liquid 4, which is in a range between 50 kPa to 100 kPa, for example, approximately 80 kPa.

Figure 10:
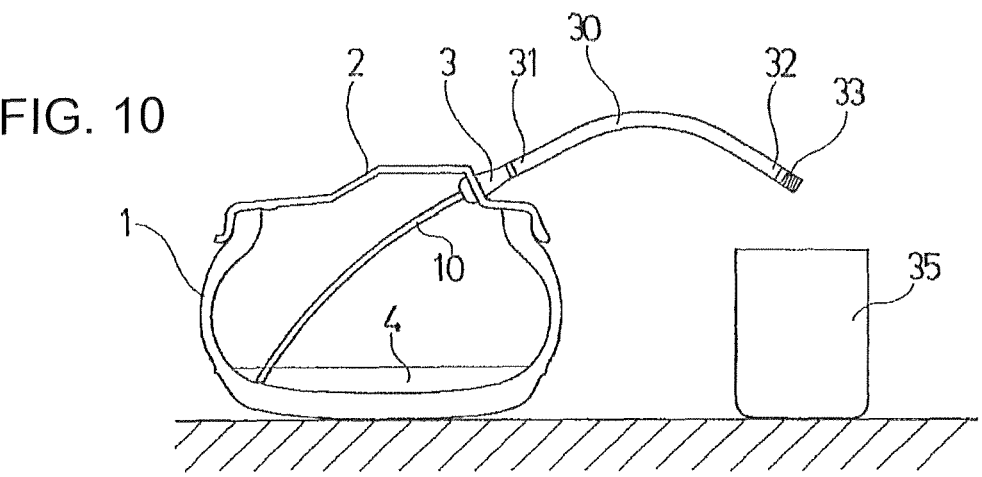
FIG. 10 is a side view showing a draining step performed by the device for recovering puncture repair liquid in FIG. 1.

As shown in FIG. 10, the hose 22 of the pressurized air source 20 is detached from the end portion 32 of the pipe member 30 after the tire 1 is filled with air. The puncture repair liquid 4 in the tire 1 is recovered through the other end portion 32 by utilizing an action caused by the pressure escaping from the tire 1. The puncture repair liquid 4 may be recovered in a container 35 having an appropriate capacity.

Specifically, since the pipe member 30 has flexibility, the passage in the pipe member 30 is closed by bending or making flat the pipe member 30 after the tire 1 is filled with air. In this state, the hose 22 of the pressurized air source 20 is detached from the end portion 32 of the pipe member 30, and then the passage in the pipe member 30 is opened. The puncture repair liquid 4 may be recovered in this manner. This can prevent the puncture repair liquid 4 from spattering when the pressurized air source 20 is detached. However, when the pipe member 30 is sufficiently long, the passage in the pipe member 30 is not necessarily closed. This is because the draining of the puncture repair liquid 4 requires some time in this case.

Figure 11:
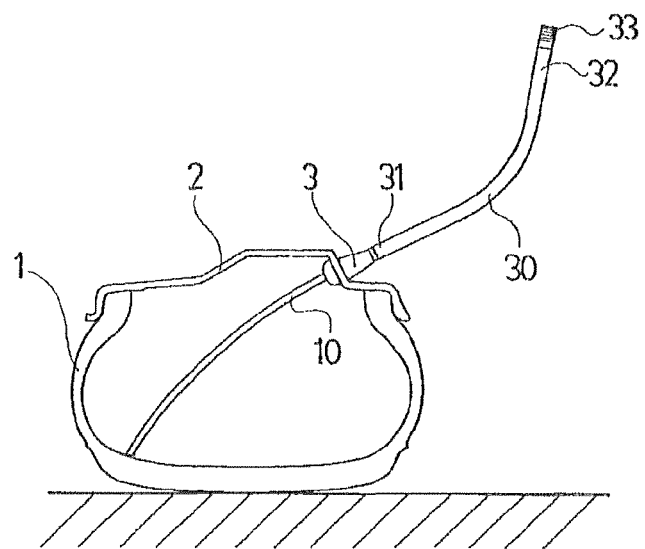
FIG. 11 is a side view showing a gas discharging step performed by the device for recovering puncture repair liquid in FIG. 1.

When the recovery of the puncture repair liquid 4 is approximately completed, air is discharged from the end portion 32 of the pipe member 30. At this time, as shown in FIG. 11, the end portion 32 of the pipe member 30 may be made to face upward. This can prevent the puncture repair liquid 4 from spattering.

According to the aforementioned method for recovering puncture repair liquid, the tire valve 3 does not have to be cut out when the puncture repair liquid 4 in the tire 1 is recovered. After the puncture repair liquid 4 is recovered, the tire valve 3 can be used as it is. In addition, since the tube 10 can be made as wide as possible within an allowable range of the tire valve 3, the puncture repair liquid 4 can be recovered in a short time based on the pressure inside the tire 1. Thus, the recovery operation of the puncture repair liquid 4 can be efficiently performed without cutting out the tire valve 3.

FIGS. 12 to 16(c) show devices for recovering puncture repair liquid according to variations of the embodiment shown in FIG. 1. In these variations, only structures of pipe members are different from that in the aforementioned embodiment. Thus, the same components in FIGS. 12 to 16(c) as those in FIG. 1 are denoted by the same reference numerals, and detailed descriptions of the components will be omitted.

Figure 12:
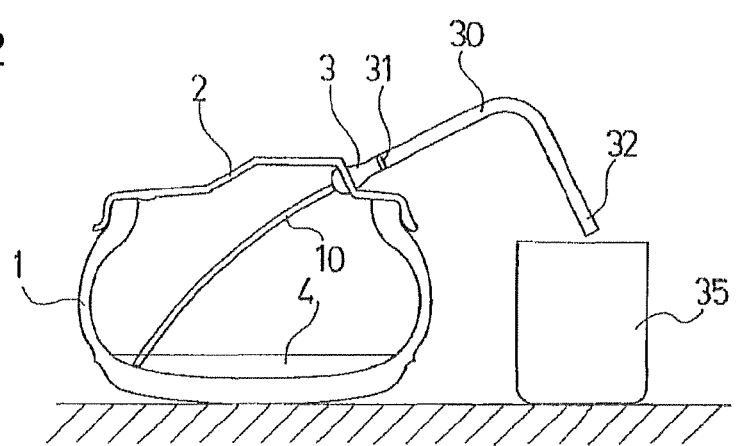
FIG. 12 is a side view showing a device for recovering puncture repair liquid according to another embodiment.

In the embodiment in FIG. 12, the pipe member 30 has a bent contour. When the puncture repair liquid 4 is recovered, the end portion 32 of the pipe member 30 is made to face downward. This can prevent the puncture repair liquid 4 from spattering, and the puncture repair liquid 4 can be recovered into the container 35 reliably. As described above, it is possible to appropriately select how the pipe member 30 is bent.

Figure 13:
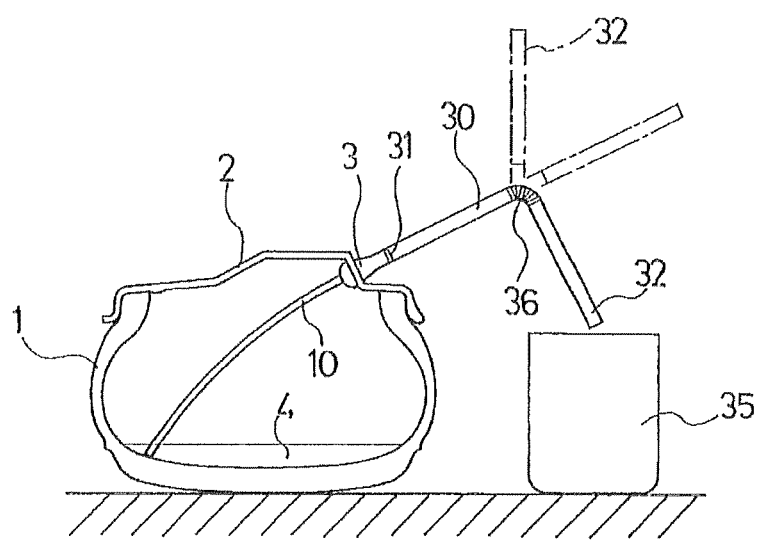
FIG. 13 is a side view showing a device for recovering puncture repair liquid according to still another embodiment.
Figure 14:
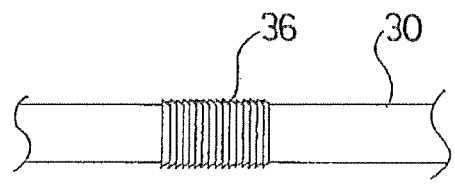
FIG. 14 is a side view showing a bellows portion of a pipe member in the device for recovering puncture repair liquid in FIG. 13.

In the embodiment in FIG. 13, the pipe member 30 has a bellows portion 36 in a portion thereof in a longitudinal direction thereof (see FIG. 14). The bellows portion 36 may be formed by being processed integrally with the pipe member 30. Alternatively, separate pipes may be connected to both sides of the bellows portion 36 to form the pipe member 30. In the case where the pipe member 30 has the bellows portion 36 in the portion thereof in the longitudinal direction thereof as described above, the pipe member 30 is in the following states. Specifically, when filling the tire 1 with air, the pipe member 30 is in a straight state. When recovering the puncture repair liquid 4, the end portion 32 of the pipe member 30 is made to face downward. When discharging air from the inside of the tire 1, the end portion 32 of the pipe member 30 is made to face upward. Thus, the puncture repair liquid 4 can be prevented from spattering, and the puncture repair liquid 4 can be recovered into the container 35 reliably. Moreover, an optimum work state can be ensured in each step above.

Figure 15:
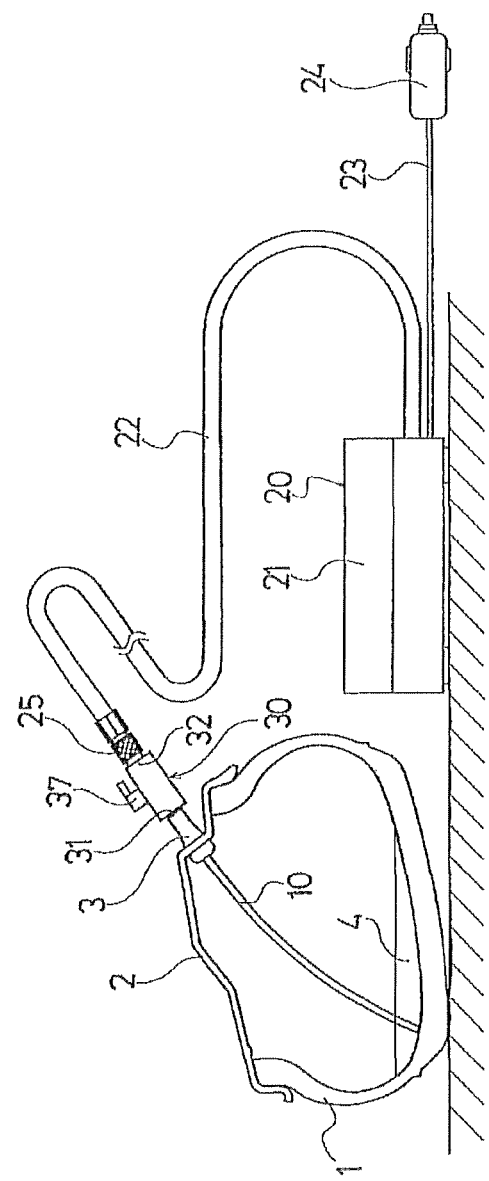
FIG. 15 is a side view showing a device for recovering puncture repair liquid according to yet another embodiment.
Figure 16:
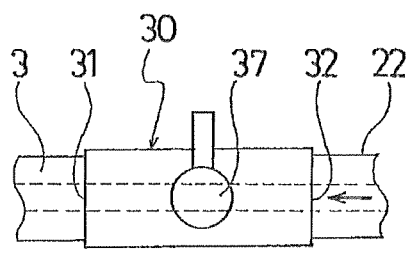
FIG. 16 shows
Figure 16:
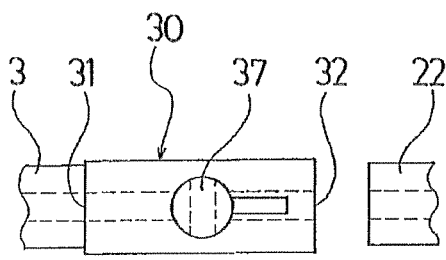
Figure 16:
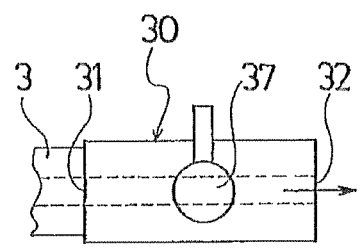

In the embodiment in FIG. 15, the pipe member 30 has an opening/closing valve 37 in a portion thereof in the longitudinal direction thereof. More specifically, as shown in FIGS. 16(a) through 16(c), the opening/closing valve 37 is arranged in a passage connecting the one end portion 31 and the other end portion 32 of the pipe member 30, and the passage of the pipe member 30 is opened or closed based on the state of the opening/closing valve 37.

In this case, the tube 10 is firstly inserted into the tire 1 via the tire valve 3, and the pipe member 30 is then connected between the tire valve 3 and the pressurized air source 20. Thereafter, as shown in FIG. 16(a), with the opening/closing valve 37 opened, the tire 1 is filled with air from the pressurized air source 20. Next, as shown in FIG. 16(b), with the opening/closing valve 37 closed, the hose 22 of the pressurized air source 20 is detached from the end portion 32 of the pipe member 30. Thereafter, as shown in FIG. 16(c), the opening/closing valve 37 is opened, and thereby the puncture repair liquid 4 in the tire 1 is recovered through the other end portion 32 of the pipe member 30 by utilizing the action caused by the pressure escaping from the tire 1. In the case where the pipe member 30 has the opening/closing valve 37 in the portion thereof in the longitudinal direction thereof, it is possible to prevent the puncture repair liquid 4 from spattering when the pressurized air source 20 is detached from the pipe member 30.

Meanwhile, in each aforementioned embodiment, the puncture repair liquid 4 is recovered through the other end portion 32 of the pipe member 30, and a flexible bag can be used as a container for the recovery as well as a bucket, a bottle, or the like. In addition, the puncture repair liquid 4 is preferably coagulated in the flexible bag by a coagulant.

Figure 17:
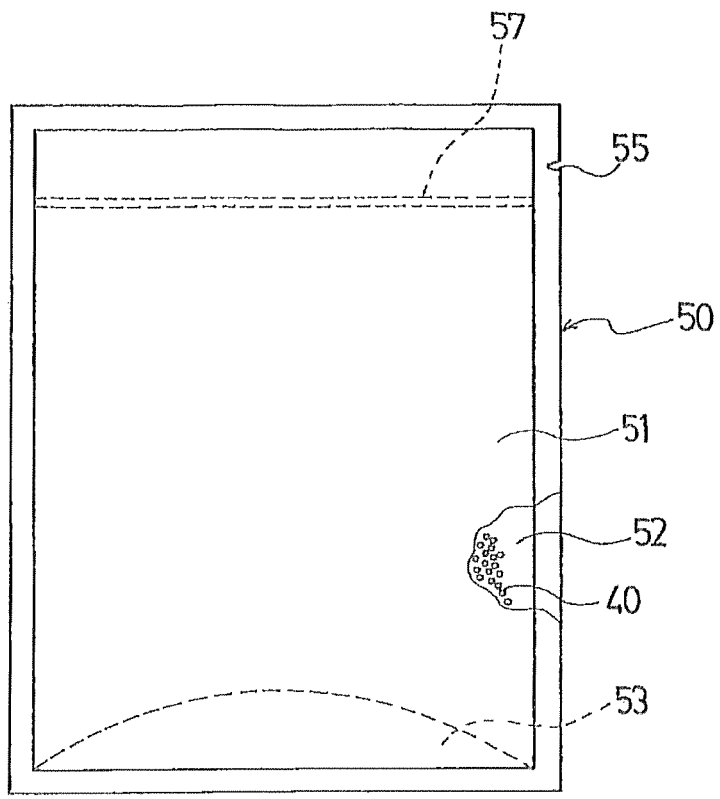
FIG. 17 is a side view showing a flexible bag with its part torn off, the bag being used in the embodiments and having a coagulant enclosed therein.
Figure 18:
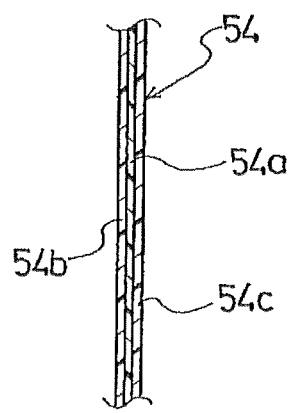
FIG. 18 is an enlarged cross-sectional view showing a laminated film forming the bag in FIG. 17.
Figure 19:
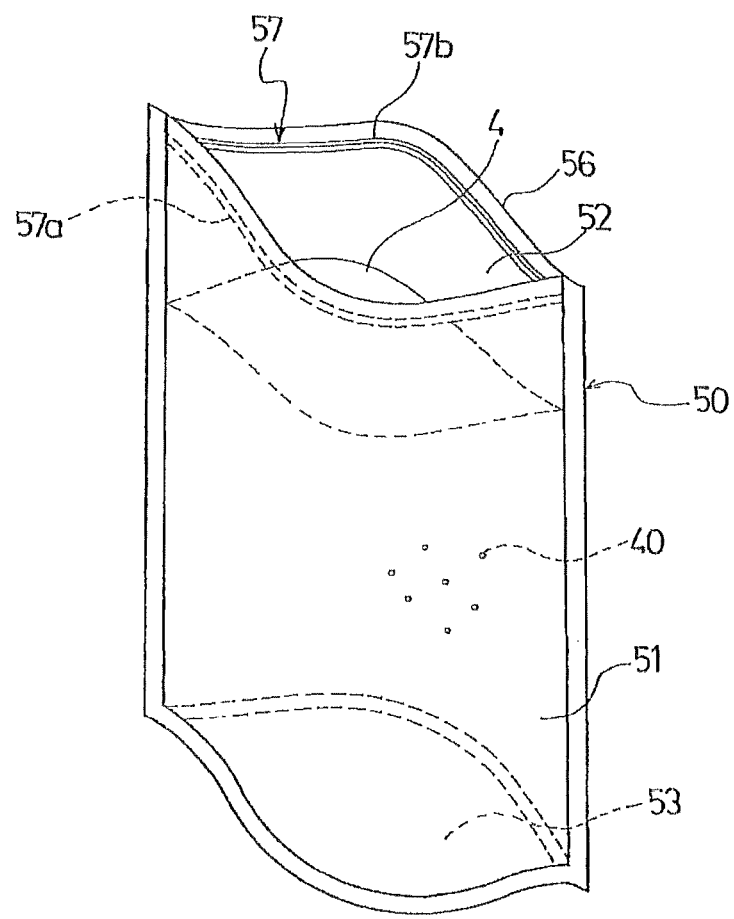
FIG. 19 is a perspective view showing a used state of the bag in FIG. 17.

FIGS. 17 to 19 show the flexible bag used in the first embodiment and having the coagulant enclosed therein. As shown in FIG. 17, the device for recovering puncture repair liquid according to this embodiment includes a coagulant 40 for coagulating the puncture repair liquid and a flexible bag 50 for receiving and containing the puncture repair liquid.

The coagulant 40 is not particularly limited, as long as the coagulant 40 coagulates puncture repair liquid containing emulsion particles. For example, a coagulant described in Japanese patent application Kokai publication No. 2009-41006 can be used. The coagulant contains a gelation agent and a mineral which induces aggregation of the emulsion particles.

As the mineral, at least one mineral selected from the group consisting of silicate, oxide, and carbonate can be used. For example, at least one mineral selected from the group consisting of alumina, sodium silicate, magnesium silicate, aluminum silicate, montmorillonite, bentonite, and zeolite may be used.

In contrast, as the gelation agent, at least one gelation agent selected from the group consisting of polyethylene oxide, polypropylene oxide, hydroxyethyl cellulose, degeneration polymers thereof, sodium alginate, propylene glycol alginate, and dibenzylidene sorbitol may be used.

An amount of the gelation agent may be 20 to 700 parts by weight, and may be preferably 60 to 200 parts by weight with respect to a mineral of 100 parts by weight. However, the coagulant can contain an additive as necessary in addition to the mineral and the gelation agent. Examples of the additive include a filler, an age resistor, an antioxidant, a pigment (a dye), a plasticizer, a thyxotropic agent, an ultraviolet absorber, a flame retardant, a surfactant, a dispersant, a dehydrator, and an antistatic agent.

Meanwhile, the flexible bag 50 is formed by heat sealing two side sheets 51 and 52 and a single gusset 53 which are each formed by a laminated film 54. The bag 50 has the coagulant 40 enclosed therein in advance. The bag 50 desirably has a capacity of 700 ml to 2000 ml to receive and contain the puncture repair liquid recovered from the inside of the tire. The gusset 53 is provided to a lower portion of the bag 50. The gusset 53 is folded before the bag 50 is used, but may always be opened. Anyhow, the bag 50 is configured to stand while having a solid shape with the gusset 53 opened.

As shown in FIG. 18, the laminated film 54 includes: an intermediate layer 54a having a gas barrier property; an inner layer 54b laminated on an inner side of the intermediate layer 54a; and an outer layer 54c laminated on an outer side of the intermediate layer 54a. As a material forming the intermediate layer 54a, a synthesis resin having low gas permeability such as an ethylene-vinylalcohol copolymer (EVOH), polyamide (PA), polyvinylidene chloride (PVDC), polyvinyl alcohol (PVA), MX nylon (MXD6) or a polyacrylonitride resin (PAN), and a metal foil such as an aluminum foil can be used. In contrast, as materials of the inner layer 54b and the outer layer 54c, synthesis resins such as polyethylene, polyester, and nylon can be used to ensure the mechanical strength and a weathering. The inner layer 54b and the outer layer 54c are preferably made of the same material, but may be made of materials different from each other according to required characteristics.

The thickness of the intermediate layer 54a may be set at 5 μm to 200 μm in the case of the synthesis resin. In the case of the metal foil such as the aluminum foil, the thickness may be set at 1 nm to 500 nm and preferably 5 nm to 200 nm. A too thin thickness of the intermediate layer 54a causes deterioration of the gas barrier property. On the contrary, a too thick thickness thereof causes deterioration of the flexibility. In addition, the thicknesses of the inner layer 54b and the outer layer 54c may be set at 5 μm to 100 μm. Too thin thicknesses of the inner layer 54b and the outer layer 54c deteriorate a durability in mixing the puncture repair liquid and the coagulant together. On the contrary, too thick thicknesses deteriorate the flexibility.

Note that the inner layer 54b and the outer layer 54c may each be a single layer or may be a multi-layer made of different materials. In the case of the multi-layer, a total thickness thereof may be set at 5 μm to 100 μm.

A tear notch 55 is provided in an upper portion in a side edge of the bag 50. The bag 50 is designed such that an opening portion 56 (see FIG. 19) is formed by tearing off an upper end portion of the bag 50 from the tear notch 55 which is a tear start point. In addition, the bag 50 is provided with a seal zone 57 along the opening portion 56. A structure of the seal zone 57 is not particularly limited, as long as the opening portion 56 can be sealed. For example, the seal zone 57 can include a concave groove 57a and a convex groove 57b, the concave groove 57a extending along the opening portion 56 in the one side sheet 51, the convex groove 57b extending along the opening portion 56 in the other side sheet 52 and being elastically fitted in the concave groove 57a.

When the puncture repair liquid 4 is recovered by using the coagulant 40 and the bag 50 described above, an upper end of the bag 50 containing the coagulant 40 is opened, and the puncture repair liquid 4 drawn from the inside of the tire 1 is injected into the bag 50, as shown in FIG. 19. Next, the opening portion 56 of the bag 50 is sealed by the seal zone 57, and then the puncture repair liquid 4 and the coagulant 40 are mixed together by kneading the flexible bag 50 to thereby coagulate the puncture repair liquid 4 in the bag 50. As the result, the spent puncture repair liquid 4 can be disposed of together with the bag 50 as burnable waste easily and quickly.

In the aforementioned method for recovering puncture repair liquid, since the seal zone 57 is provided along the opening portion 56 of the flexible bag 50, it is possible to reliably prevent the puncture repair liquid 4 from overflowing during kneading the bag 50.

Moreover, the flexible bag 50 is formed by the laminated film 54 the intermediate layer 54a having the gas barrier property, and the bag 50 has the coagulant 40 enclosed therein in advance. Thus, the enclosed coagulant 40 is not exposed to air, and the quality thereof can be maintained for along time.

Further, since the bag 50 has the gusset 53 in the lower portion to have a self-standing structure, there is no need to support the bag 50 when the puncture repair liquid 4 is drawn from the inside of the tire 1. This provides an advantage that all the recovery operations can be performed by a one operator alone even if an operation of a valve or the like is required at the time of drawing the puncture repair liquid 4 from the inside of the tire 1.

In the aforementioned embodiments, the descriptions have been given for the case where the flexible bag is formed by a laminated film including the intermediate layer having the gas barrier property and where the coagulant is enclosed in the bag in advance. However, in the present invention, a soft plastic bag or the like may be used as the flexible bag, and the coagulant may be enclosed in another package having the gas barrier property. In this case, the coagulant may be injected into the flexible bag together with the puncture repair liquid to mix the puncture repair liquid and the coagulant together.

Figure 20:
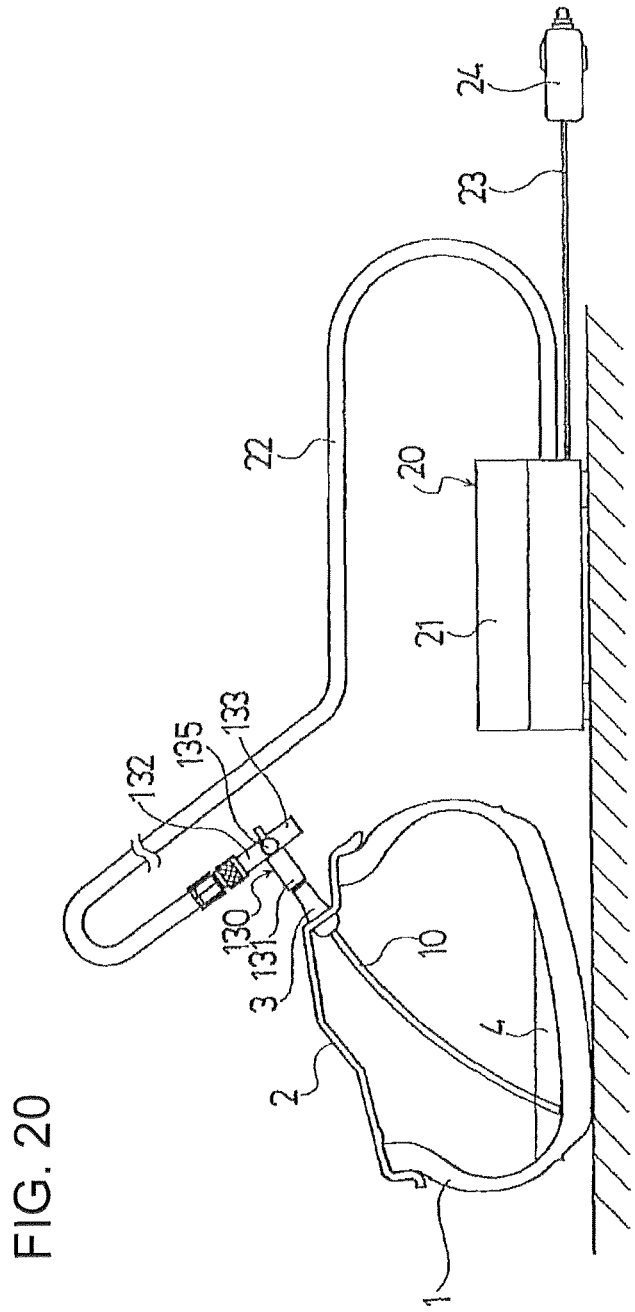
FIG. 20 is a side view showing a device for recovering puncture repair liquid according to another embodiment.
Figure 21:
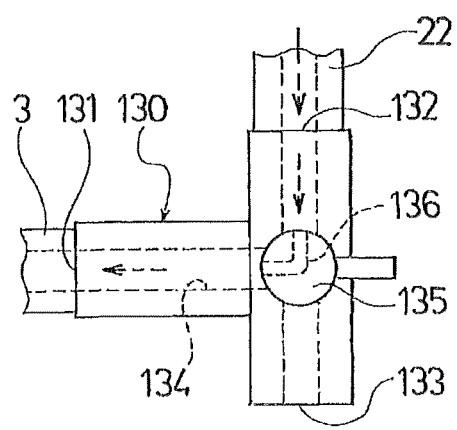
FIGS. 21(a) and 21(b) show side views of different operation states of a drainage device in the device for recovering puncture repair liquid as shown in FIG. 20.
Figure 21:
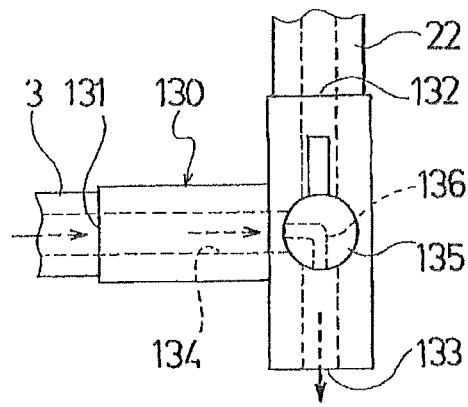

FIGS. 20 through 21(b) show a device for recovering puncture repair liquid according to another embodiment. FIG. 20 shows the pneumatic tire 1, the wheel 2, the tire valve 3 mounted to the wheel 2, and the puncture repair liquid 4 injected into the pneumatic tire 1.

As shown in FIG. 20, the device for recovering puncture repair liquid in this embodiment includes the tube 10 and a drainage device 130. The tube 10 has at least such a length that the tube 10 reaches the inner surface of the tire when inserted into the tire 1 from the tire valve 3 of the wheel 2. The drainage device 130 is connected between the tire valve 3 and the pressurized air source 20.

The tire valve 3 and the tube 10 which are the same as those described in the aforementioned embodiments are used (see FIG. 2, FIGS. 3(a) through 3(c), and FIGS. 4(a) and 4(b)). Thus, a detailed description of the tire valve 3 and the tube 10 will be omitted.

As shown in FIG. 20, the pressurized air source 20 includes the electrical compressor 21, the hose 22 connected to the compressor 21, and the cord 23 and the plug 24 for connecting the compressor 21 to the power source.

Note that since the pressurized air source 20 is not required to supply a high pressure, a bicycle pump or the like can be used instead of the aforementioned electrical compressor 21. In this case, the power supply is not needed. A commercial large-scale compressor can be used instead of the portable compressor 21, as a matter of course.

As shown in FIGS. 21(a) and 21(b), the drainage device 130 has a structure in which the drainage device 130 includes a valve connection port 131 connected to the tire valve 3, a pressurization port 132 connected to the hose 22 of the pressurized air source 20, and a drainage port 133 for draining the puncture repair liquid 4 and in which a selector valve 135 is provided to a passage 134 selectively connecting the valve connection port 131 with the pressurization port 132 or the drainage port 133. The drainage device 130 is attached to the tire valve 3 in such a manner that the drainage port 133 faces downward. A structure of connecting the valve connection port 131 and the tire valve 3 and a structure of connecting the pressurization port 132 and the hose 22 of the pressurized air source 20 are not particularly limited. The connections may be made by mechanical fastening or fitting utilizing elastic deformation.

In the drainage device 130, the passage 134 branches into a T-shape, while the selector valve 135 has an L-shaped guide path 136. In addition, the pressurization port 132 and the drainage port 133 are arranged at opposed positions. The drainage device 130 is designed such that the valve connection port 131 is made to communicate with the pressurization port 132 at a first switching position of the selector valve 135 shown in FIG. 21(a) and that the valve connection port 131 is made to communicate with the drainage port 133 at a second switching position of the selector valve 135 shown in FIG. 21(b).

Next, a description is given of a method for recovering puncture repair liquid by using the aforementioned device for recovering puncture repair liquid. Firstly, as shown in FIG. 20, the valve core is detached from the tire valve 3 in the wheel 2 with the tire 1 mounted thereon into which the puncture repair liquid 4 has been injected, and the tube 10 is inserted into the tire 1 via the tire valve 3. Since the length of the tube 10 has been adjusted to an appropriate length in advance, one end of the tube 10 contacts the inner surface of the tire, while the locking portion 11 thereof on the tire valve side is locked with the narrowest portion 3d of the through-hole 3a of the tire valve 3.

Next, the valve connection port 131 of the drainage device 130 is connected with the tire valve 3, while the hose 22 of the pressurized air source 20 is connected with the pressurization port 132 of the drainage device 130. Thereby, the drainage device 130 is connected between the tire valve 3 and the pressurized air source 20 to form a series of pressurized air supply paths. Then, the tire 1 is filled with air from the pressurized air source 20 while the selector valve 135 makes the valve connection port 131 of the drainage device 130 communicate with the pressurization port 132. An amount of injecting the puncture repair liquid 4 is, for example, approximately 650 ml in the case of the size of 215/60R16. Thus, the air pressure inside the tire 1 may be set to be a pressure for draining such an amount of the puncture repair liquid 4, which is in a range from 50 kPa to 100 kPa, for example, approximately 80 kPa. After the tire 1 is filled with air, the valve connection port 131 of the drainage device 130 is made to communicate with the drainage port 133 by the selector valve 135. Thereby, the puncture repair liquid 4 in the tire 1 is recovered through the drainage port 133 of the drainage device 130 by utilizing the caused by the pressure escaping from the tire 1.

According to the aforementioned method for recovering puncture repair liquid, the tire valve 3 does not have to be cut out in recovering the puncture repair liquid 4 in the tire 1. After the puncture repair liquid 4 is recovered, the tire valve 3 can be used as it is. In addition, since the tube 10 can be made as wide as possible within an allowable range of the tire valve 3, the puncture repair liquid 4 can be recovered in a short time based on the pressure inside the tire 1. Thus, the recovery operation of the puncture repair liquid 4 can be efficiently performed without cutting out the tire valve 3.

Moreover, the drainage device 130 is designed as follows. The passage 134 branches into the T-shape, the selector valve 135 has the L-shaped guide path 136, the pressurization port 132 and the drainage port 133 are arranged at opposed positions, the valve connection port 131 is made to communicate with the pressurization port 132 at the first switching position of the selector valve 135, and the valve connection port 131 is made to communicate with the drainage port 133 at the second switching position of the selector valve 135. Thus, such a switching mistake as to make the pressurization port 132 and the drainage port 133 communicate with each other can be reliably prevented.

Figure 22:
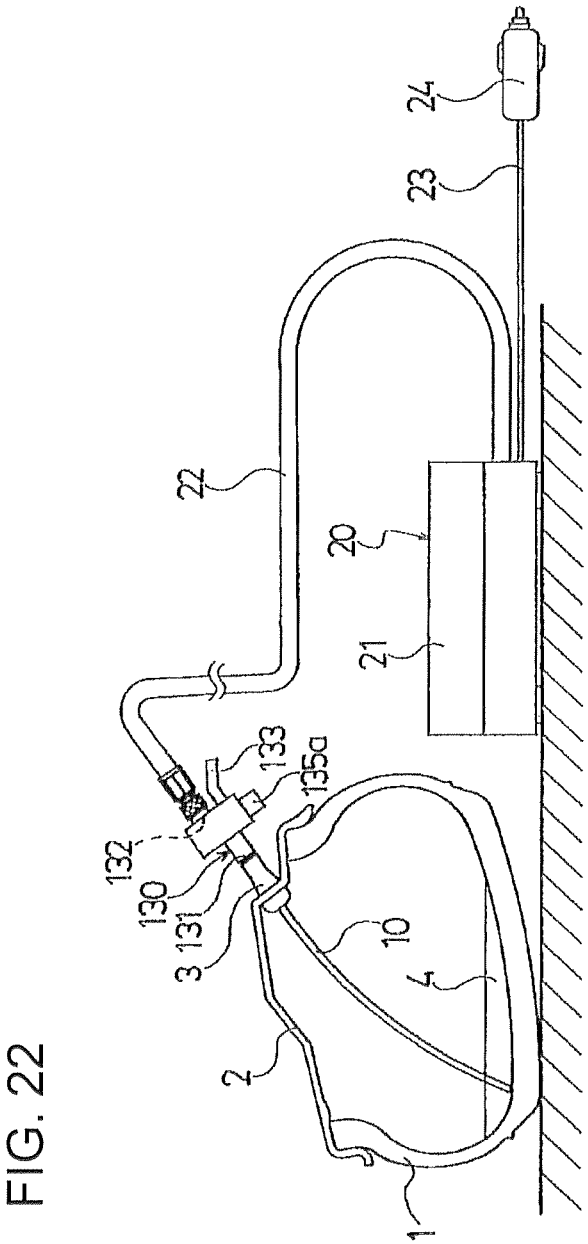
FIG. 22 is a side view showing a device for recovering puncture repair liquid according to another embodiment.
Figure 23:
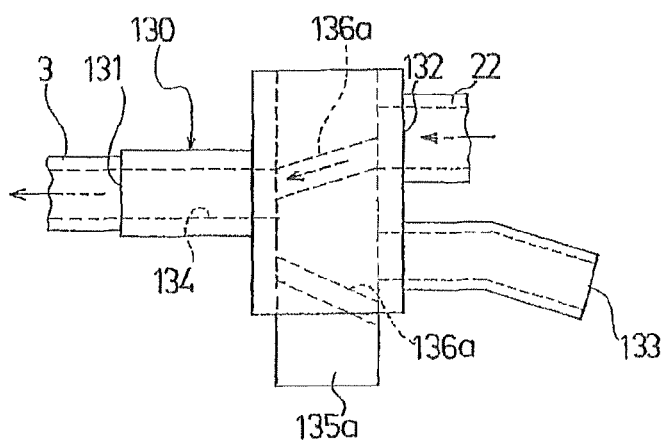
FIGS. 23(a) and 23(b) are side views showing different operation states of a drainage device in the device for recovering puncture repair liquid as shown in FIG. 22.
Figure 23:
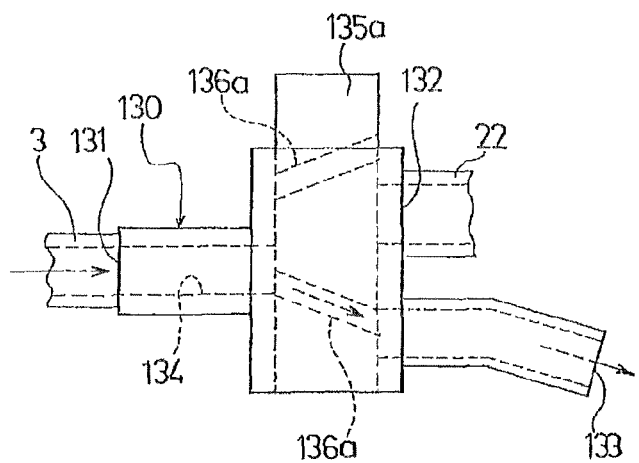

FIGS. 22, 23(a) and 23(b) show a device for recovering puncture repair liquid according to variations of the embodiment shown in FIGS. 20 through 21(b). In this embodiment, only a structure of the drainage device is different from those in the aforementioned embodiment, the same components in FIGS. 22, 23(a) and 23(b) as those in FIGS. 20, 21(a) and 21(b) are denoted by the same reference numerals, and detailed descriptions of the components will be omitted.

As shown in FIGS. 23(a) and 23(b), the drainage device 130 has a structure in which the drainage device 130 includes the valve connection port 131 connected to the tire valve 3, the pressurization port 132 connected to the hose 22 of the pressurized air source 20, and the drainage port 133 for draining the puncture repair liquid 4 and in which a selector valve 135a is provided to the passage 134 selectively connecting the valve connection port 131 with the pressurization port 132 or the drainage port 133. The drainage device 130 is attached to the tire valve 3 in such a manner that the drainage port 133 faces downward. Also in this case, a structure of connecting the valve connection port 131 and the tire valve 3 and a structure of connecting the pressurization port 132 and the hose 22 of the pressurized air source 20 are not particularly limited. The connections may be made by mechanical fastening or fitting utilizing elastic deformation.

The drainage device 130 is configured such that the piston-like selector valve 135a includes two straight guide paths 136a and is slidable in a direction orthogonal to the center axis of the tire valve 3. The drainage device 130 is also configured such that the valve connection port 131 is made to communicate with the pressurization port 132 at a first switching position of the selector valve 135a shown in FIG. 23(a) and that the valve connection port 131 is made to communicate with the drainage port 133 at a second switching position of the selector valve 135a shown in FIG. 23(b). Note that the selector valve 135a is configured to be resiliently urged to stop at each switching position so that the switching position is not changed easily. In addition, a limiter can be provided that makes the selector valve 135a automatically perform switching when the air pressure in the tire 1 reaches a certain threshold.

Also in the embodiment described above as in the aforementioned embodiment, the recovery operation of the puncture repair liquid 4 can be efficiently performed without cutting out the tire valve 3. In addition, the drainage device 130 is configured as follows. The selector valve 135a includes the two guide paths 136a and is slidable in the direction orthogonal to the center axis of the tire valve 3. The valve connection port 131 is made to communicate with the pressurization port 132 at the first switching position of the selector valve 135a, and the valve connection port 131 is made to communicate with the drainage port 133 at the second switching position of the selector valve 135a. Thus, such a switching mistake as to make the pressurization port 132 and the drainage port 133 communicate with each other can be reliably prevented.

In the aforementioned embodiments, the puncture repair liquid 4 is recovered through the drainage port 133. When almost no puncture repair liquid 4 remains in the inside of the tire 1 at the final stage of the recovery operation, the remaining high-pressure air might cause the puncture repair liquid 4 to vigorously spatter from the drainage port 133. Hence, the drainage port 133 may be provided with a spattering prevention member for preventing the puncture repair liquid 4 from spattering.

Figure 24:
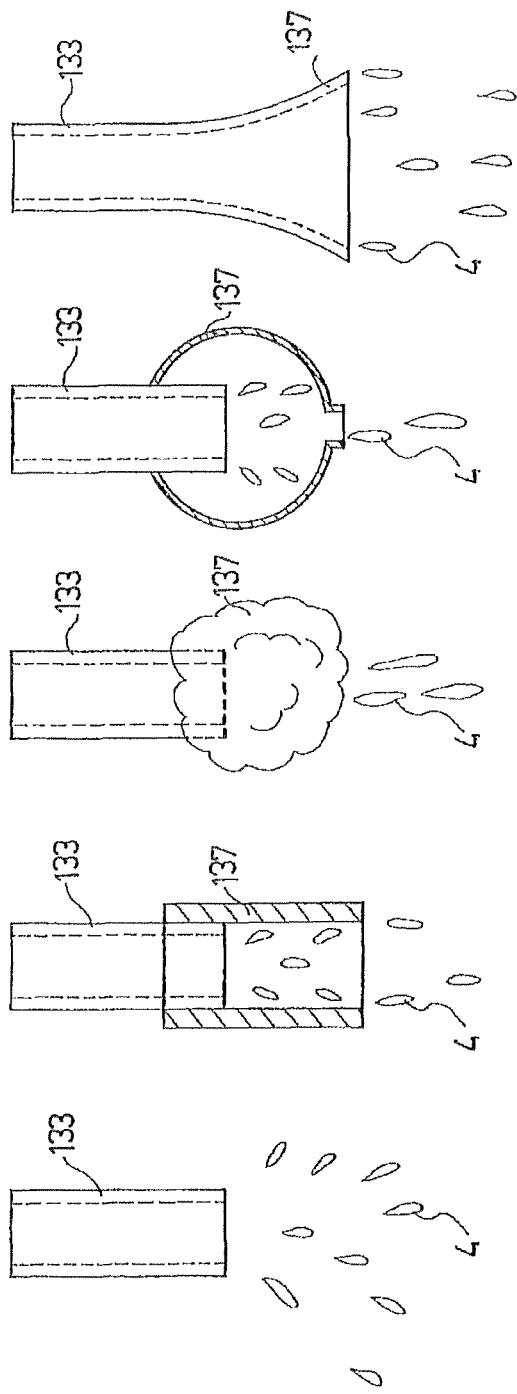
FIGS. 24(a) through 24(e) are side views showing modifications of a drainage port of the drainage device used in the embodiment shown in FIG. 22.

FIGS. 24(a) through 24(e) show modifications of the drainage port of the drainage device used in the embodiment shown in FIGS. 20 through 21(b). In FIG. 24(a), the drainage port 133 is not provided with the spattering prevention member, and thus the puncture repair liquid 4 spatters. In FIG. 24(b), a spattering prevention member 137 formed by a tube such as a hose thicker than the drainage port 133 is attached to the drainage port 133. FIG. 24(c), the drainage port 133 is covered with a spattering prevention member 137 made of fabric such as meshed fabric or non-woven fabric. FIG. 24(d), a spattering prevention member 137 forming a spherical pool space is attached to the drainage port 133. FIG. 24(e), a spattering prevention member 137 widened to have a horn shape is formed on the drainage port 133 so as to decrease a flow rate of the puncture repair liquid 4. hi each case, providing the spattering prevention member 137 to the drainage port 133 can prevent the puncture repair liquid 4 from spattering, and thus the recovery operation of the puncture repair liquid 4 can be performed more efficiently.

Meanwhile, in each aforementioned embodiment, the puncture repair liquid 4 is recovered through the drainage port 133, and a flexible bag can be used as a container for the recovery as well as a bucket, a bottle, or the like. In addition, the puncture repair liquid 4 is preferably coagulated in the flexible bag by the coagulant.

That is, it is preferable that the puncture repair liquid 4 according to the embodiment be include the coagulant 40 for coagulating the puncture repair liquid and the flexible bag 50 for receiving and containing the puncture repair liquid (see FIGS. 17 to 19). As the coagulant 40 and the flexible bag 50, the same as those in the aforementioned embodiment can be used. Thus, a detailed description of the structures and the usages of the coagulant 40 and the flexible bag 50 will be omitted.

The preferable embodiments of the present invention have been described in detail, but it shall be understood that the preferred embodiments can be variously modified, substituted, and replaced without departing from the spirit or scope of the present invention as defined by the appended scope of claims.

The invention claimed is:

1. A method for recovering puncture repair liquid comprising:
    detaching a valve core from a tire valve of a wheel with a tire mounted thereon into which puncture repair liquid has been injected;
    inserting a tube into the tire via the tire valve, the tube having at least such a length that the tube reaches an inner surface of a tire when inserted into the tire from the tire valve attached to the wheel;
    connecting one end portion of a pipe member to the tire valve;
    connecting a pressurized air source to an other end portion of the pipe member;
    filling the tire with air from the pressurized air source, and then detaching the pressurized air source from the other end portion of the pipe member; and
    recovering the puncture repair liquid in the tire through the other end portion of the pipe member due to pressure of the air escaping from the tire.

2. The method for recovering puncture repair liquid according to claim 1, wherein
    when the pressurized air source is detached from the other end portion of the pipe member a passage in the pipe member becomes closed due to flexibility of the pipe member; and
    the recovering of the puncture repair liquid through the other end portion of the pipe member includes opening the passage in the pipe member.

3. The method for recovering puncture repair liquid according to claim 1, further comprising
    an attachment to the other end portion of the pipe member, the attachment being removably attachable to the pressurized air source and having an opening portion which is opened in a direction crossing an axial direction of the pipe member; and
    the recovering of the puncture repair liquid occurs with the opening portion of the attachment facing downward.

4. The method for recovering puncture repair liquid according to claim 1, wherein
    the pipe member has a bent contour or a curved contour; and
    the recovering of the puncture repair liquid occurs with the other end portion of the pipe member facing downward due to the bent contour or curved contour.

5. The method for recovering puncture repair liquid according to claim 1, wherein
    the pipe member has a bellows portion in a portion thereof in a longitudinal direction thereof; and
    the recovering of the puncture repair liquid occurs with the other end portion of the pipe member facing downward.

6. The method for recovering puncture repair liquid according to claim 1, wherein
    the pipe member has an opening/closing valve in a portion thereof in a longitudinal direction thereof;
    the filling of the tire with air from the pressurized air source includes opening the opening/closing valve;

the detaching of the pressurized air source from the other end portion of the pipe member includes closing the opening/closing valve and detaching the pressurized air source while the opening/closing valve is closed; and the recovering of the puncture repair liquid includes opening the opening/closing valve and recovering the puncture repair liquid in the tire through the other end portion of the pipe member while the opening/closing valve is open.

7. The method for recovering puncture repair liquid according to claim 1, wherein the tube is narrower than a narrowest portion of a through-hole of the tire valve;

a locking portion thicker than the narrowest portion of the through-hole of the tire valve is provided at an end portion of the tube on a tire valve side of the tube; and the inserting inserts the end portion of the tube into the tire.

8. The method for recovering puncture repair liquid according to claim 1, wherein the tube and the pipe member are connectable with each other; and the connecting of the one end portion of the pipe member to the tire valve includes connecting the tube and pipe member to each other.

9. The method for recovering puncture repair liquid according to claim 1, wherein the tube comprises a scale indicating a cutting length; and the method further comprises cutting the tube, according to a tire size, based on the scale.

10. The method for recovering puncture repair liquid according to claim 9, wherein the scale is directly indicated on the tube.

11. The method for recovering puncture repair liquid according to claim 1, wherein the recovering of the puncture repair liquid comprises injecting the puncture repair liquid drawn from the inside of the tire into a flexible bag containing a coagulant for coagulating the puncture repair liquid;

mixing the puncture repair liquid and the coagulant together in the bag; and recovering the puncture repair liquid in a coagulated state which occurs due to the mixing.

12. A device for recovering puncture repair liquid comprising:

a tube having at least such a length that the tube reaches an inner surface of a tire when inserted into the tire from a tire valve mounted to a wheel; and a pipe member having one end portion configured to connect to the tire valve, an other end portion configured to connect to a pressurized air source, and a bellows portion in a portion thereof in a longitudinal direction thereof.

13. The device for recovering puncture repair liquid according to claim 12, wherein the pipe member has flexibility.

14. The device for recovering puncture repair liquid according to claim 12, further comprising an attachment configured to connect to the other end portion of the pipe member; and the attachment is configured to removably attach to the pressurized air source and has an opening portion opened in a direction crossing an axial direction of the pipe member.

15. The device for recovering puncture repair liquid according to claim 12, wherein the pipe member has a bent contour or a curved contour.

16. The device for recovering puncture repair liquid according to claim 12, wherein the pipe member has an opening/closing valve in a portion thereof in a longitudinal direction thereof.

17. The device for recovering puncture repair liquid according to claim 12, wherein the tube is narrower than a narrowest portion of a through-hole of the tire valve; and a locking portion thicker than the narrowest portion of the through-hole of the tire valve is provided at an end portion on a tire valve side of the tube.

18. The device for recovering puncture repair liquid according to claim 12, wherein the tube and the pipe member are connectable with each other.

19. The device for recovering puncture repair liquid according to claim 12, the tube comprises a scale indicating a cutting length.

20. The device for recovering puncture repair liquid according to claim 19, wherein the scale is directly indicated on the tube.

21. The device for recovering puncture repair liquid according to claim 12, further comprising a flexible bag configured to receive and contain the puncture repair liquid, the flexible bag including a coagulant for coagulating the puncture repair liquid.

22. A method for recovering puncture repair liquid comprising:

detaching a valve core from a tire valve of a wheel with a tire mounted thereon into which a puncture repair liquid has been injected;

inserting a tube into the tire via the tire valve, the tube having at least such a length so that the tube reaches an inner surface of the tire when inserted into the tire from the tire valve mounted to the wheel;

connecting a valve connection port of a drainage device to the tire valve;

connecting a pressurized air source to a pressurization port of the drainage device;

filling the tire with air from the pressurized air source in a state where the valve connection port of the drainage device is made to communicate with the pressurization port by a selector valve which selectively connect the valve connection port with the pressurization port or a drainage port;

operating the selector valve to cause the valve connection port of the drainage device to communicate with the drainage port;

providing a spattering prevention member at the drainage port to prevent the puncture repair liquid from spattering; and recovering the puncture repair liquid in the tire through the drainage port of the drainage device due to pressure of the air escaping from the tire.

23. The method for recovering puncture repair liquid according to claim 22, wherein in the drainage device a passage branches into a T-shape to the pressurization port and the drainage port;

the selector valve has an L-shaped guide path; and the pressurization port and the drainage port are arranged at opposed positions of the drainage device; and the method further comprises
> before performing the filling, positioning the selector valve to a first switching position to cause the valve connection port to communicate with the pressurization port; and the operating of the selector valve to cause the valve connection port of the drainage device to communicate with the drainage port includes positioning the selector valve to a second switching position to cause the valve connection port to communicate with the drainage port.

24. The method for recovering puncture repair liquid according to claim 22, wherein
> in the drainage device, the selector valve comprises two guide paths and is slidable in a direction orthogonal to a center axis of the tire valve;
>
> the method further comprises
>> before performing the filling, positioning the selector valve to a first switching position to cause the valve connection port to communicate with the pressurization port; and
>
> the operating of the selector valve to cause the valve connection port of the drainage device to communicate with the drainage port includes positioning the selector valve to a second switching position to cause the valve connection port to communicate with the drainage port.

25. The method for recovering puncture repair liquid according to claim 22, wherein
> the tube is narrower than a narrowest portion of a through-hole of the tire valve;
>
> a locking portion thicker than the narrowest portion of the through-hole of the tire valve is provided at an end portion on a tire valve side of the tube; and
>
> the inserting inserts the end portion of the tube into the tire.

26. The method for recovering puncture repair liquid according to claim 22, wherein
> the tube comprises a scale indicating a cutting length; and
>
> the method further comprises cutting the tube, according to a tire size, based on the scale.

27. The method for recovering puncture repair liquid according to claim 26, wherein
> the scale is directly indicated on the tube.

28. The method for recovering puncture repair liquid according to claim 22, wherein
> the recovering of the puncture repair liquid comprises
>> injecting the puncture repair liquid drawn from the inside of the tire into a flexible bag containing a coagulant for coagulating the puncture repair liquid;
>>
>> mixing the puncture repair liquid and the coagulant together in the bag; and
>>
>> recovering the puncture repair liquid in a coagulated state which occurs due to the mixing.

29. A device for recovering puncture repair liquid, comprising:
> a tube having at least such a length that the tube reaches an inner surface of a tire when inserted into the tire from a tire valve mounted to a wheel;
>
> a drainage device comprising a valve connection port configured to connect to the tire valve, a pressurization port configured to connect to a pressurized air source, a drainage port configured to drain puncture repair liquid, and a selector valve configured to selectively connect the valve connection port with the pressurization port or the drainage port; and
>
> a spattering prevention member configured to prevent the puncture repair liquid from spattering at the drainage port.

30. The device for recovering puncture repair liquid according to claim 29, wherein
> the drainage device defines a passage that branches into a T-shape to the pressurization port and the drainage port;
>
> the selector valve has an L-shaped guide path;
>
> the pressurization port and the drainage port are arranged at opposed positions of the drainage device;
>
> the valve connection port is made to communicate with the pressurization port at a first switching position of the selector valve; and
>
> the valve connection port is made to communicate with the drainage port at a second switching position of the selector valve.

31. The device for recovering puncture repair liquid according to claim 29, wherein
> in the drainage device
>> the selector valve comprises two guide paths and is slidable in a direction orthogonal to a center axis of the tire valve;
>>
>> the valve connection port is made to communicate with the pressurization port at a first switching position of the selector valve; and
>>
>> the valve connection port is made to communicate with the drainage port at a second switching position of the selector valve.

32. The device for recovering puncture repair liquid according to claim 29, wherein
> the tube is narrower than a narrowest portion of a through-hole of the tire valve; and
>
> a locking portion thicker than the narrowest portion of the through-hole of the tire valve is provided at an end portion on a tire valve side of the tube.

33. The device for recovering puncture repair liquid according to claim 29,
> the tube comprises a scale indicating a cutting length.

34. The device for recovering puncture repair liquid according to claim 33, wherein
> the scale is directly indicated on the tube.

35. The device for recovering puncture repair liquid according to claim 29, further comprising
> a flexible bag configured to receive and contain the puncture repair liquid, the flexible bag containing a coagulant for coagulating the puncture repair liquid.

* * * * *